United States Patent [19]

McClintock

[11] 4,134,389
[45] Jan. 16, 1979

[54] SOLAR ENERGY COLLECTOR

[76] Inventor: Michael McClintock, 162 Commercial St., Boston, Mass. 02109

[21] Appl. No.: 795,167

[22] Filed: May 2, 1977

[51] Int. Cl.$^2$ .............................................. F24J 3/02
[52] U.S. Cl. ................................ 126/271; 237/1 A; 165/107 R; 165/170
[58] Field of Search ............... 126/270, 271; 237/1 A, 237/66, 80; 165/11, 18, 39, 47, 107, 172, 170; 137/59–62

[56] References Cited

U.S. PATENT DOCUMENTS

| 3,076,450 | 2/1963 | Gough et al. | 126/271 |
| 4,015,582 | 4/1977 | Liu et al. | 126/270 |
| 4,044,754 | 8/1977 | Cronin et al. | 126/271 |
| 4,055,163 | 10/1977 | Costello | 126/271 |
| 4,063,545 | 12/1977 | Hapgood | 126/271 |

Primary Examiner—Kenneth W. Sprague
Assistant Examiner—James C. Yeung
Attorney, Agent, or Firm—Robert J. Doherty

[57] ABSTRACT

Structural plastic materials are normally not resistant to elevated temperatures, and accordingly presently have only limited applications in solar energy collection devices despite their decided cost advantages. The present invention enables the widespread use of such plastic materials, in fact enables the essentially complete construction of solar collection devices thereof. An optically dense radiant heat absorbable fluid is passed through the device and utilized to collect solar energy from such devices. Should such fluid not be present within the device for any reason, e.g. upon pump failure, sunlight entering is positively directed outwardly thereof. Preferably the outward direction of sunlight from the fluid receiving chamber is accomplished by providing one of the surfaces forming such chamber with a highly reflective surface so that the sun's rays are outwardly deflected. In certain embodiments, as when the device is used as an architectural window, when such fluid is not present within the device, the solar energy is directed entirely through the device. In this manner, the chamber temperature may be held within tolerable levels for the particular plastics utilized.

3 Claims, 4 Drawing Figures

SOLAR ENERGY COLLECTOR

BACKGROUND OF THE INVENTION

The present invention comprises a method and device for collecting the energy of sunlight in a desired area and converting this energy into heat in a fluid that circulates through the collection device. Devices of this general nature are known and include those devices disclosed in the following U.S. Pat. Nos:

| 991,161 | McHENRY | May 2, 1911 |
| 1,888,620 | CLARK | November 22, 1932 |
| 2,489,751 | CANDLER, JR. | November 29, 1949 |
| 3,107,052 | GARRISON | October 15, 1963 |
| 3,250,269 | SHEROCK | May 10, 1966 |
| 3,918,430 | STOUT et al | November 11, 1975 |
| 3,939,819 | MINARDI | February 24, 1976 |

Accordingly, it is known to utilize a heat absorptive black liquid medium such as disclosed by the MINARDI and GARRISON patents rather than relying on more conventional blackened copper or other metals as the heat collection medium. It is further known to utilize sunlight reflective surfaces in order to concentrate or otherwise divert solar energy into fluid chambers such as chamber 42 and receptacle 7 of SHEROCK and STOUT, respectively. Such reflective surfaces of STOUT and SHEROCK are respectively indicated by reference numerals 38 and 13. The above patents are believed representative of the prior art and their citation and discussion above constitutes applicant's Prior Art Statement. A copy of each patent is enclosed along with the present application.

There still remains, however, an inability to widely utilize structural plastic to form solar collection devices since the temperatures to which such may be subjected upon removal of the heat absorbing fluid thereof, either on purpose as when further absorption is not desired, or accidentally as upon pump failure, can rise to temperatures above temperature levels at which such materials tend to distort, melt or otherwise structurally fail. It would accordingly be highly desirable to be able to utilize relatively inexpensive structural plastic materials in part, and preferably essentially entirely, in the construction of solar collection devices.

SUMMARY OF THE INVENTION

The subject solar collector has several innovative features that serve to significantly decrease its construction costs. The collector is of the absorbent liquid type, and includes a transparent fiberglass reinforced polyester resin system, contains no metal except for inlet and outlet fittings, is exceptionally light, shows promise of long useful life, and from early efficiency measurements appears to equal or surpass the best of other types. Since a fully assembled 20 sq. ft. panel may weigh less than 75 pounds, is engineered for simple installation on an existing roof, and since material costs are low, panels of the subject invention would be expected to meet with ready consumer acceptance.

In brief, the promise of solar collectors made essentially entirely of plastic materials is high, and appears to be borne out by present efforts. As previously indicated, the major reason such plastic collectors are not commercially utilized lies in the destructive results of a power failure or a pump failure on a hot summer day.

Under conditions of bright incident sunlight without the cooling provided by a circulating working fluid, internal collector temperatues reach rather high values. A rough estimate of the internal temperature under these conditions can be obtained from the equation expressing the steady-state energy balance for a flat plate collector. Since the useful heat transferred to the working fluid, $Q_U$, and storage term, $Q_S$, can be neglected, the energy balance takes the simple form:

$$HRA_c (\tau\alpha) = Q_L \qquad (1)$$

in which H is the solar radiation on a horizontal surface, R is an orientation factor which multiplies H in order to obtain the radiation on the collector oriented in a specified way at a specified latitude, $A_c$ is the collector area, $(\tau\alpha)$ is the product of transmittance of the cover system and absorptance of the plate in the short wavelength region of the sun's spectrum, and $Q_L$, the collector energy loss term is given by $$Q_L = U_L A_c (T_p - T_a) \qquad (2)$$

where $U_L$ is the collector overall loss coefficient, $T_p$ is the average plate temperature, and $T_a$ is the ambient temperature.

Combining equations (1) and (2), solving for $T_p$, and using reasonable values for the quantities represented shows that internal temperatures can reach 350° or even 450° F. Obviously if one is to utilize plastics, it is necessary also to develop a fail safe way in which overheating of the collector can be prevented.

If instead of the usual black absorber plate we incorporate the energy absorbent medium into the working fluid, provide a means by which the "black" working fuild is not present in the collector in the event there is a power failure, and then make that part of the collector which becomes the "absorber plate" (in the absence of the working fluid) reflective of the sun's energy rather than absorbent, we have a method for keeping the collector interior considerably cooler in the event of a power failure. In fact, adopting the subscript 2 to refer to this situation and the subscript 1 to refer to the former, we can express the high temperature difference in the two cases as follows:

$$T_{p1} - T_{p2} = HR/U_L [(\tau\alpha_1) - (\tau\alpha_2)] \qquad (3)$$

Again, using reasonable values as before, we see that we can keep the interior of the collector roughly 200° to 300° F. cooler by this means, and can now utilize a broad range of plastics for collectors which were previously "unavailable" for such use.

A specific embodiment of this method of collecting the energy contained in sunlight and converting it to useful heat comprises (1) a series of one or more translucent or transparent covers, (2) a chamber including two covers, the upper of which is transparent or translucent, the lower of which is either white in color or is reflective of visible light, or which is transparent or translucent, and between which (3) a fluid medium is interposed which is optically dense to any desired degree in any desired region of the visible spectrum.

Because of the unique features of this device, which will be made clear in the following description, the maximum temperatures to which it will be subjected under certain conditions of its operation are considerably lower than those of other such devices. Therefore such device may contain parts or may itself be constructed entirely of materials, such as certain plastic materials, which will not retain their integrity when subjected to high temperatures. Since certain plastic materials are highly breakage resistant, various parts of such devices, such as the covers mentioned previously, may be of thinner construction, and this can result in lower cost of manufacture and, in suitable formulations, greater transparency than that of glass. Additionally, by allowing plastics as materials of construction, corrosive effects of the fluid medium which commonly beset the metal parts of other such devices may be minimized, and problems of differential thermal expansion which commonly beset such devices made of dissimilar materials may be minimized. Further, by allowing translucent or transparent plastics as materials of construction, and the use of colored fluid media, aesthetically pleasing architectural effects may be created.

Other objects, features and advantages of the invention shall become apparent as the description thereof proceeds when considered in connection with the accompanying illustrative drawing.

DESCRIPTION OF THE DRAWING

In the drawing which illustrates the best mode presently contemplated for carrying out the present invention.

DESCRIPTION OF THE INVENTION

Figure 1:
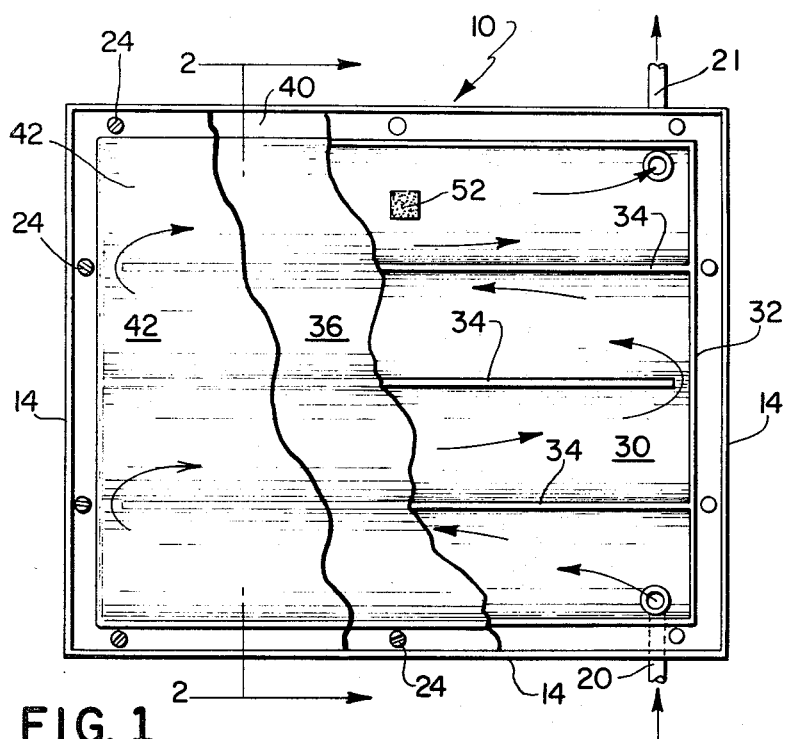
FIG. 1 is a plan view of a solar collector device constructed in accordance with the present invention.
Figure 2:
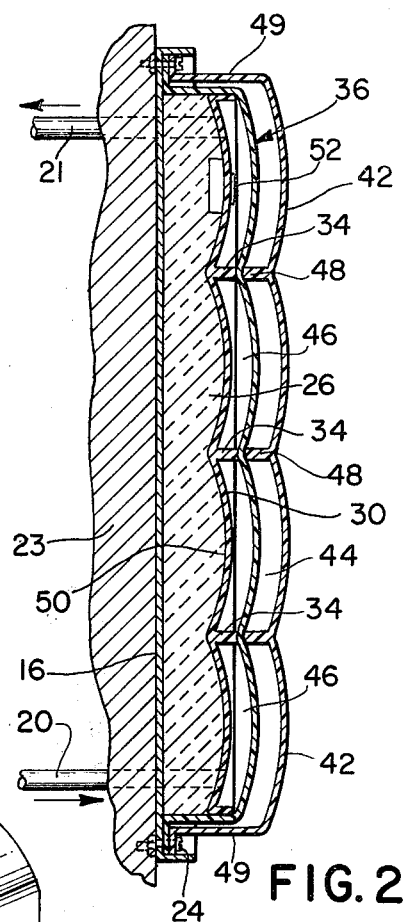
FIG. 2 is a side sectional view taken along the line 2—2 thereof.
Figure 3:
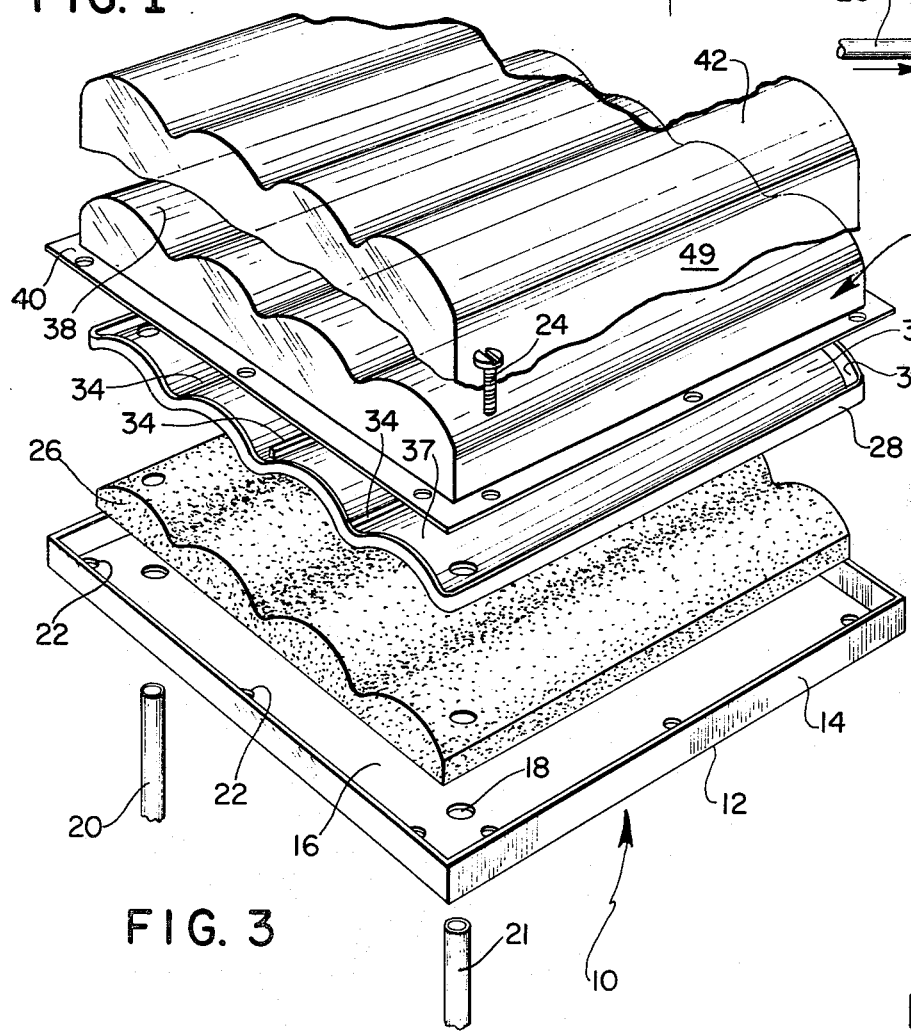
FIG. 3 is an exploded perspective view of the component parts thereof prior to assembly.

Referring to FIGS. 1-3, a solar collector device 10 representing one form of the invention is shown such device 10 includes a frame-like member 12 of generally flat rectangular configuration having upstanding edges or side walls 14 and a bottom wall 16 through which appropriate openings 18 are formed for receipt of fluid inlet and outlet pipes 20 and 21 respectively. Wall 16 is adapted for attachment to a wall 23 or may be free standing and is provided with connection openings 22 for receipt of connection means such as bolts 24. Suitable insulation material such as the block 26 thereof is disposed within the frame 12 and a base panel 28 is adapted to rest thereon. The base 28 includes a bottom wall 30 and peripheral upstanding sides 32. The bottom 30 is in turn provided with a plurality of webs 34 which are longitudinally directed therealong and laterally spaced from each other. Alternate such webs 34 are inwardly directed from one of the sides of the base 28 and terminate short of the opposite side thereof and in this manner and as best illustrated by simultaneous reference to FIGS. 1 and 3, forms a circuitous or sinuous path between such base 28 and a cover 36 adapted to interfit therewith.

The bottom wall 30 of the base 28 is further provided with upwardly curved segments 37 between each longitudinally extending web 34 in order to provide the base with a series of domelike configurations in order that the wall thicknesses thereof may be low and still provide the necessary structural rigidity and strength. The cover 36 is similarly provided with domelike segments 38 for disposition over those of the base 28 and further includes a peripheral flange 40 for connection with the frame 12, as previously indicated by means of fastening means 24. An additional cover 42 may be provided so as to provide an insulating space 44 above the cover 36 as best depicted in FIG. 2.

Also in FIG. 2, the manner in which the base 28 and the cover 36 engage with each other is most clearly shown and wherein the upstanding webs 34 form a support for the cover 36 by contacting under portions of such, and in this way also provide sealing contact between the base and cover and accordingly define individual fluid receiving channels 46. Also, contact between the top peripheral edge of sides 32 of the base 28 and portions of the cover 36 are such that a liquid tight sealing engagement is formed therebetween. The contact between the base and cover above described is generally through known adhesive connection however other mechanisms such as gasket sealing are not excluded. Entrance of black liquid to the channels 46 is accomplished by means of the pipe 20 and removal by pipe 21 both passing through the insulation 26 and the base 28 and opening into the space between such base and its cover 36 that is, into one of the channels 46.

The second or insulating cover 42 may be similarly of domed configuration to enhance its strength characteristics and may be separated from the channel-forming cover 36 by means of spacers 48. Furthermore such insulating cover includes downwardly extending sides 49 suitably fastened as in conjunction with the flange 40 of the cover 36 to the frame 12. The bottom 30 may itself be reflective or at the upper or the under surface thereof may include a highly reflective layer 50. A heat absorbable patch 52 of small area is also provided on the surface of the bottom wall 30 and necessarily is disposed between such reflective layer 50 and the channels 46 as will hereinafter be apparent.

The space beneath the lowermost cover or base 28 may be filled with insulating material 26, such as foamed polyurethane, foamed polystyrene, or fiberglass insulating material. Heat thus collected in the fluid medium M is inhibited from loss by conduction through the lowermost cover to surroundings at lower temperature. In some particular applications, however, said insulating material may be absent. For example, in warm climates or when said device is mounted directly on the roof of a structure, said insulating material may be unnecessary. Or it may be desired to employ said device as part of a wall, celing, or other architectural unit of a structure and to allow light to pass through said device. In such case, the several covers and base comprising the device may be transparent or translucent and the fluid medium my be colored and may be caused to circulate through the device only during periods of bright sunshine, thus reducing the entering light during such periods, rendering it collored for more pleasant effect, and allowing collection of the energy in that portion of the spectrum in which the fluid is optically dense.

Figure 4:
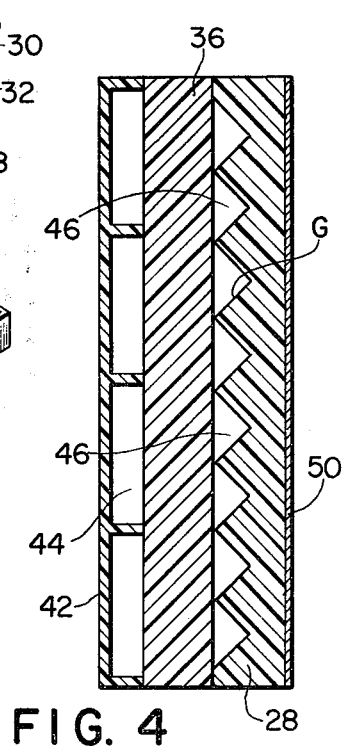
FIG. 4 is a cross-sectional view similar to FIG. 2 but showing an alternate embodiment of a solar collector.

Turning now to FIG. 4, the construction and configuration of the base and cover elements thereof is essentially the same as in the previous embodiments, however the base 28 and cover 36 thereof are formed of blocklike plastic materials, the individual channels 46 formed by machining individual grooves G in the surface of the base 28. Such grooves may be interconnected by manifolds (not shown) at opposite sides thereof, or as in the previous embodiment form a single circuitous path for receipt of fluid medium. Similarly an outer insulating cover 42 is attached thereto as by glueing or the like.

The construction and operation of this unique solar energy collector may be more easily described by tracing the path of incoming energy from the sun through its several serially arranged surfaces in a particular embodiment. Thus solar energy first impinges on the uppermost transparent or translucent cover 42, the largest fraction of said energy passing through said cover and into the space behind it.

The solar energy next encounters another transparent or translucent cover 36, the largest fraction of said energy passing through said cover and into the chamber behind it, and adapted for receipt of fluid medium, M, which is opaque, partially opaque, or optically dense to any desired degree in any portion of the solar spectrum. Said fluid medium enters said tank through an inlet pipe 20, circulates in the chamber or channels 46 between said cover and still another lowermost base 28, and leaves the tank through an outlet pipe 21. In some cases the cover and the base may be joined by adhesive but preferably by suitable mechanical fasteners as depicted at various places to form enclosed channels 46 in which the fluid may flow, as depicted by arrows in FIG. 1.

The number of said such insulating covers need not be one, but may be one or more, the most practical number in temperature climates being two. In some particular applications, however, said insulating cover may be absent. A suitable material of which the covers may be made is glass fiber-reinforced polyester resin because of its low cost, high translucency in suitable formulations, and high impact resistance, but said covers may be of other transparent or translucent materials. The base 28 may also be formed from similar plastic materials.

The solar energy incident upon the device is absorbed in the opaque or partially opaque fluid medium and causes the temperature of said fluid medium to rise. Solar energy is thus converted by this process directly into heat within the circulating fluid medium without being first absorbed by an intermediary surface or substance, as is the case, for example, with many flat plate solar energy collectors which employ a blackened metal surface. In a particular embodiment the opaque or partially opaque fluid medium may be water containing suitable material which renders the water optically dense in any desired portion of the solar spectrum, such as any of a number of dyes or inks, but need not be limited to these substances, and which leaves no significant residue when said fluid is allowed to drain from the device. Normally the device drains by gravity.

The base may be transparent, translucent, opaque, reflective, or may be colored, but may typically be white opaque plastic material in order to reflect solar energy at such time as the fluid medium may not be present in its customary chamber. Also the upper or the lower surface thereof may be coated to provide a highly reflective surface. The solar energy collector is thus prevented from becoming heated to such a high temperature that damage or degradation of its several parts take place under such conditions. The small area 52 of several square inches provided on the base may be black or otherwise absorptive of incident solar energy to allow absorption of solar energy in the absence of the fluid medium for purposes of controlling circulation of the fluid medium.

In operation a solar energy collection device such as described may be tilted from the horizontal in a direction toward the earth's equator in order to allow sunlight to fall upon it throughout the day. At such time as there may be sufficient solar energy incident on the device to allow the addition of heat to the fluid medium, a suitable detecting device, for example a thermistor and associated electrical circuitry, in thermal contact with the black area 52, provides electrical actuation of a suitable pump (not shown) or other circulating device in order to cause the fluid medium to enter the individual channels 46 of the chamber and circulate through the device. During such time as said fluid is circulating through the chamber said fluid prevents the device from overheating. The detecting device in thermal contact with area 52 senses the temperature of said fluid, and when insufficient solar energy is available, said fluid is allowed to drain from the device. If for any reason, either planned or unplanned, the fluid medium should not be present in the chamber of the device, said device will not overheat since the white or otherwise reflective surface 50 of the base 28 prevents all but area 52 from absorbing sufficient solar energy to cause such overheating to take place. Also, in those cases wherein the cover or covers and the base comprising the device are transparent or translucent, as when the device is used as a part of a wall or ceiling, i.e. a window in a house or other structure, the sunlight may pass directly through the device to avoid overheating thereof and so as to permit the light to heat the interior of the structure. In such cases, the device acts as a passive rather than an active solar collecting device.

As can be understood from the foregoing explanation, this invention allows construction of a solar energy collection device which need contain no metal, but may if desired be constructed entirely of plastic materials, since it is maintained at a temperature acceptable to such plastic materials either by presence of the fluid medium in the chamber or, in the absence of said fluid medium, by rejection of the incident solar energy due to the reflective nature of the base 28. The advantages of constructing such devices using plastic materials have been put forward in a foregoing section of this description.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A solar energy collection device operable in both active and passive modes, comprising at least one face panel and a base panel each formed of generally non solar energy absorbent plastic materials structurally distortable above a predetermined temperature level positioned in opposed spaced relationship to each other and forming a fluid chamber therebetween, said base panel defining lower portions of said chamber, said cover being at least translucent to permit entry of solar energy into said chamber, means for sensing the amount of solar energy available from said device, pump means for passing an optically dense solar heat absorbent fluid under positive pressure through said chamber wherein said fluid will absorb heat from solar energy passing into said chamber, means for removing said fluid from said chamber either when it is not desired to absorb solar energy in said fluid in the active operational mode of said device or upon failure of said pump means, said base panel also being at least translucent such that sunlight will pass directly through said panels and said chamber at those times when said optically dense fluid is removed from said chamber so as to enable said device to operate in said passive mode while simultaneously thereby maintaining the temperature of said structurally distortable panels below said predetermined temperature, said base having an upstanding peripheral edge in liquid sealing contact with portions of said cover and further having a plurality of parallel and spaced inwardly directed grooves formed therein, said cover further integrally connected and accordingly sealingly engaged with base portions between said grooves so as to form separate generally straight, non-serpentine flow paths which are capable of receiving said heat absorbent fluid under pressure from said pump means, and manifold means at each end of said individual flow paths for simultaneously directing said fluid into and out of all of said flow paths.

2. The device of claim 1, said pump means being responsive to said sensing means for both introducing and removing fluid from said chamber.

3. The device of claim 1, said device being a part of an architectural structure, means for sensing the need of heat in said structure, said pump means responsive thereto to remove fluid from said chamber so as to permit solar energy to shine directly through said panels into the interior of said structure when said solar energy is available and heat is needed in said structure and for passing said fluid through said chamber when solar energy is available and when heat is not needed in said structure.

* * * * *